No. 613,180. Patented Oct. 25, 1898.
H. H. WALLS.
AIR PUMP.
(Application filed Apr. 20, 1897.)
(No Model.)
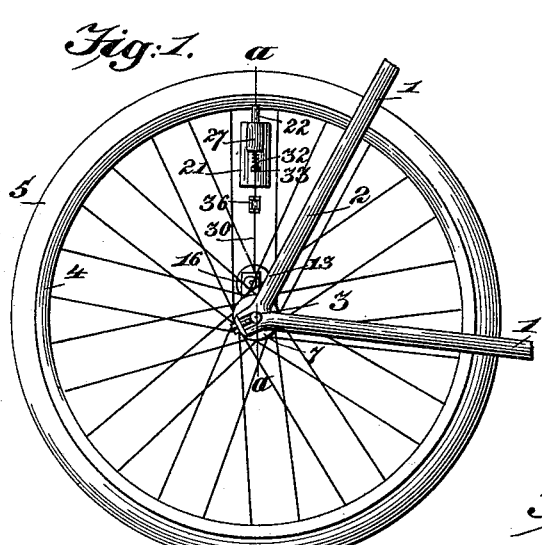
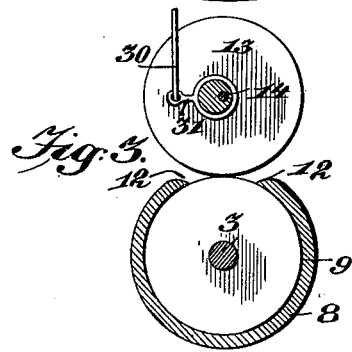
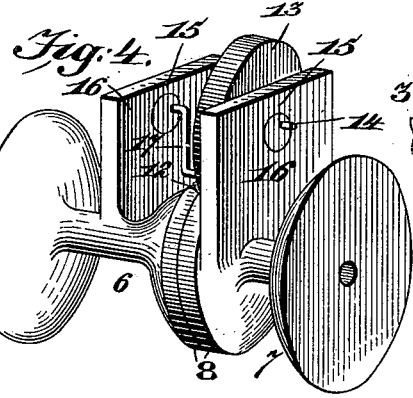
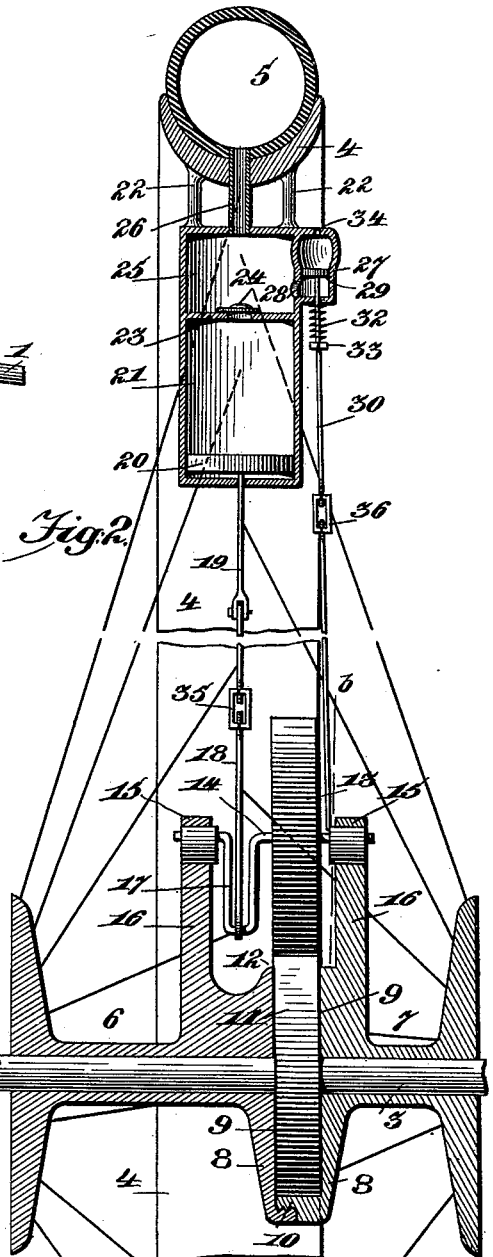
Witnesses
Inventor
Hayden H. Walls
By his Attorneys,

UNITED STATES PATENT OFFICE.

HAYDEN H. WALLS, OF BEDFORD, INDIANA.

AIR-PUMP.

SPECIFICATION forming part of Letters Patent No. 613,180, dated October 25, 1898.

Application filed April 20, 1897. Serial No. 633,006. (No model.)

*To all whom it may concern:*

Be it known that I, HAYDEN H. WALLS, a citizen of the United States, residing at Bedford, in the county of Lawrence and State of Indiana, have invented a new and useful Air-Pump, of which the following is a specification.

This invention relates to certain improvements in air-pumps, and especially in that class of pumps which are designed for inflating the pneumatic tires of bicycles, carriages, and other vehicles; and the object of the invention is to provide a device of this character of a simple and inexpensive nature which shall be carried on and actuated from the movement of the vehicle, so as to inflate the tire in a substantially automatic manner.

The invention consists in a device of this character comprising pumping devices consisting of a pump-cylinder carried by the vehicle-wheel and provided with an air-outlet communicating with the tire, a piston in the cylinder, gearing between the pumping devices and a stationary part of the vehicle whereby the pumping devices are actuated when the vehicle moves, so as to force air into the tire, and means for automatically controlling the operation of the pumping devices.

The invention also contemplates certain novel features of the construction, combination, and arrangement of the various parts of the improved air-pump whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate the invention, I have shown my improved air-pump applied to a bicycle with pneumatic tires.

In the drawings, Figure 1 is a view showing the rear part of the bicycle provided with a pumping device constructed according to my invention; and Fig. 2 is an enlarged sectional view taken in the plane indicated by the line *a a* in Fig. 1, showing the gearing for driving the pumping device. Fig. 3 is an enlarged sectional view taken in the plane indicated by the line *b b* in Fig. 2, being at right angles to the plane of the section in Fig. 2. Fig. 4 is a perspective detail view showing the construction of the bicycle-hub.

In the drawings, 1 indicates the frame of a bicycle, which may be of any construction, being provided with rear forks 2, between which is held the rear or drive wheel, having a hub carried on an axle 3, the ends of which are secured to the forks 2 in a well-known way, the opposite ends of the hub of the wheel being provided with bearings of any preferred kind and said wheel being provided with a rim 4, connected with the hub by means of spokes and carrying a pneumatic tire 5, to be inflated by means of my improved pumping device.

The hub of the wheel is formed, as shown in Fig. 4, of two parts or sections 6 and 7, adapted to be secured together at the central portion of the hub, said sections being provided with enlargements 8 at their abutting ends, which are hollowed or chambered, so as to form a space 9, surrounding the central portion of the axle 3. The enlarged end of one of the sections is provided with a screw-threaded portion 10, which is arranged to screw into the enlarged end of the other section, so as to hold the two sections securely together, as shown in Fig. 2.

On the central portion of the axle 3 is secured a friction wheel or disk 11, which stands, when the parts are assembled, as shown in Fig. 2, within the chamber or recess formed in the enlarged end portions 8 of the sections 6 and 7 of the hub, and in one side of the hub, at the said enlarged central portion thereof, is formed an opening 12, opposite to the periphery of said friction wheel or disk 11, through which opening is adapted to extend the periphery of a second friction wheel or disk 13, carried on a shaft 14, the ends of which are mounted in eccentric bearings formed in rotative boxes 15, mounted in the ends of arms 16, projecting from the sections 6 and 7 of the hub adjacent to the enlarged portions 8 thereof and in alinement with each other. By this construction it will be seen that when the bearing-boxes 15, wherein the shaft 14 is mounted, are turned in the arms 16 of the hub the friction wheel or disk 13 will be moved through the opening in the enlarged central portion of the hub into engagement with the periphery of the friction wheel or disk 11 within said enlarged portion, so that as the bicycle-wheel rotates relatively to its axle 3 the friction wheel or disk 13, carried by the hub of the wheel, will by its engagement with the friction wheel or disk 11, carried on the axle, have imparted to it a rotative movement, so that the shaft 14, whereon the wheel or disk 13 is mounted, will also be rotated. Similarly it will be seen that when the bearings 15 of the ends of the shaft are turned in the reverse direction the friction wheel or disk 13 will be moved out of engagement with the periphery of the wheel or disk 11, so that the rotative movement of the parts 13 and 14 will cease.

The shaft 14 is provided with a cranked portion 17, with which connects a crank-rod 18, extending out radially with respect to the wheel of the bicycle and having at its outer end a jointed connection with a piston-rod 19, connected with a piston 20, arranged in a pump-cylinder 21, having arms 22, by means of which it is secured to the rim of the wheel, and having adjacent to one end a diaphragm 23, extending across it and provided with a central port having a valve 24, arranged to admit air from the piston-chamber 21 when the piston 20 is moved to the chamber 25, formed by said diaphragm 23 at the outer end of the cylinder, which chamber 25 is connected by means of a pipe or passage 26 with the tire of the bicycle in such a way that the pressure of the air in the air-chamber 25 will at all times equal the pressure of the air within the tire.

At one side of the cylinder 21 is arranged a valve-casing 27, having its interior communicating by way of a port 28 with the air-chamber 25 of the cylinder, and within said valve-casing 27 is arranged to play a piston-valve 29, having a stem 30, which extends out through the wall of the valve chamber or casing toward the hub of the wheel and is connected with an arm 31, fixed to one of the eccentric bearings 15 of the shaft 14, so that, as will be observed, when the valve 29 is moved in the casing or chamber 27 the eccentric bearings of the shaft 14 will be simultaneously rotated, so as to move the friction wheel or disk 13 into or out of frictional engagement with the wheel or disk 11 within the enlarged central portion of the hub of the wheel.

On the valve stem or rod 30 is adjustably secured a collar 33, between which and the adjacent end of the valve chamber or casing 27 is held a spring 32, coiled on said stem or rod and arranged to hold the valve 29 normally in closed position, and the eccentric bearings of shaft 14 are normally held in such position that the friction-wheels will be in engagement with each other, so that the pumping devices will be actuated, as above described. The valve casing or chamber 27 is provided with an outlet 34, whereat the air may escape when the valve 29 is moved from its seat, and in order to permit of adjusting the lengths of the rods 18 and 30 I form each of said rods in sections connected by turnbuckles 35 and 36, respectively, by turning which the rods may be shortened or lengthened, as may be desired.

In the operation of the improved pumping device as the wheel of the bicycle turns it will be seen that if the pressure in the tire of the wheel falls below the normal the pressure in the air-chamber 25 will fall simultaneously, so that the spring 32 will be permitted to act to draw the valve 29 down toward its seat and force the rod or stem 30 of the valve centrally of the wheel, so as to turn the eccentric bearings of the shaft 14 and move the friction disk or wheel 13 into engagement with the wheel or disk 11 on the axle, so that the pumping devices will be actuated automatically from the movement of the wheel itself, so as to force the air into the air-chamber 25 from the cylinder 21 and inflate the tire. When the air-pressure within the tire and in the air-chamber 25 shall have risen to the desired point, it will act on the valve 29 to force the same from its seat, moving the stem or rod 30 thereof against the tension of the spring 32 outwardly, so as to turn the eccentric bearings of the shaft 14 in the opposite direction and disengage the friction-wheel 13 from the wheel or disk 11, so as to stop the pumping devices from movement. At the same time should the air-pressure rise too high within the tire and within the air-chamber 25 it is evident that the valve 29 will be raised sufficiently from its seat in the chamber or casing 27 to permit the air to escape at the outlet 34 of said chamber or casing, so that the pressure will be relieved.

From the above description it will be seen that the improved pumping device is of an extremely simple and inexpensive nature and is especially well adapted for use on bicycles, carriages, sulkies, and other vehicles having pneumatic tires, since it permits the air-pressure within the tire with which it is connected to be kept at a substantially uniform point, and it will also be seen that by means of the turnbuckles 35 and 36 and of the adjustable collar 33 upon the valve stem or rod 30 the several parts may be adjusted so as to act in proper relation with each other and to maintain the desired pressure within the tire. It will also be seen from the above description that the invention is capable of some modification without material departure from its principles and spirit, and for this reason I do not wish to be understood as limiting myself to the precise form and arrangement of the parts herein set forth.

Having thus described my invention, I claim—

1. A device for inflating pneumatic tires comprising pumping devices consisting of a pump-cylinder carried by the vehicle-wheel and provided with an air-outlet communicating with the tire, and a piston in the cylinder, gearing between the pumping devices and a part of the vehicle, whereby the pumping devices are actuated when the vehicle moves so as to force air into the tire, and a positively-actuated vent-valve operatively connected with said tire and the pumping devices for automatically controlling the operation of the pumping devices, substantially as set forth.

2. A device for inflating pneumatic tires comprising pumping devices consisting of a pump-cylinder carried by the vehicle-wheel and provided with an air-outlet communicating with the tire, and a piston in the cylinder, gearing between the pumping devices and a part of the vehicle, whereby the pumping devices are actuated when the vehicle moves so as to force air into the tire, and means for automatically controlling the operation of the pumping devices from the pressure of the air in the tire, substantially as set forth.

3. A device for inflating pneumatic tires comprising pumping devices consisting of a pump-cylinder carried by the vehicle and provided with an air-outlet communicating with the tire, and a piston in the cylinder, gearing between the pumping devices and a part of the vehicle, whereby the pumping devices are actuated when the vehicle moves so as to force air into the tire, and means for throwing the gearing out of engagement to stop the operation of the pumping devices, said means being actuated by the rise of the air-pressure in the tire, substantially as set forth.

4. A device for inflating pneumatic tires comprising pumping devices consisting of a pump-cylinder carried by the vehicle and provided with an air-outlet communicating with the tire and a piston in the cylinder, gearing between the pumping devices and a part of the vehicle, whereby the pumping devices are actuated when the vehicle moves so as to force air into the tire, an eccentric arranged to throw said gearing into and out of operation, and means to control said eccentric from the pressure of the air in the tire, substantially as set forth.

5. A device for inflating pneumatic tires comprising pumping devices consisting of a pump-cylinder carried on the vehicle and provided with an air-outlet communicating with the tire and a piston in the cylinder, gearing between the pumping devices and a part of the vehicle for pumping air into the tire when the vehicle moves, an eccentric whereon one element of the gearing is carried, and means to control said eccentric from the pressure of the air in the tire to throw the gearing into and out of operation, substantially as set forth.

6. A device for inflating pneumatic tires comprising pumping devices consisting of a pump-cylinder carried by the vehicle and provided with an air-outlet communicating with the tire and a piston in the cylinder, gearing between the pumping devices and a part of the vehicle for pumping air into the tire when the vehicle moves, a spring to hold the gearing normally in operative position, and means actuated by the rise of the air-pressure in the tire to throw the gearing out of operation, substantially as set forth.

7. A device for inflating pneumatic tires comprising pumping devices consisting of a pump-cylinder carried by the vehicle and provided with an air-outlet communicating with the tire and a piston in the cylinder, gearing between the pumping devices and a part of the vehicle for pumping air into the tire when the vehicle moves, an eccentric arranged, when moved, to throw said gearing into and out of operation, a spring to move the eccentric in one way to throw the gearing in operation, and means actuated by the pressure of the air in the tire to move said eccentric to throw the gearing out of operation, substantially as set forth.

8. A device for inflating pneumatic tires comprising pumping devices consisting of a cylinder carried on the vehicle and provided with an air-oulet communicating with the tire and a piston in the cylinder, gearing between the pumping devices and a part of the vehicle for pumping air into the tire when the vehicle moves, a piston arranged to be moved by the pressure of the air in the tire and means connected to said piston for controlling said gearing, substantially as set forth.

9. A device for inflating pneumatic tires comprising pumping devices consisting of a cylinder and a piston therein, gearing for operating the pumping devices when the vehicle moves, a spring to hold said gearing normally in operation and a piston arranged to be moved by the pressure of the air in the tire and arranged to throw said gearing out of operation, substantially as set forth.

10. A device for inflating pneumatic tires comprising pumping devices consisting of a cylinder and a piston therein, gearing for operating the pumping devices when the vehicle moves, an eccentric whereon one element of the gearing is carried arranged, when moved, to throw said gearing into and out of operation, a spring to move the eccentric in one way to throw the gearing into operation, and a piston arranged to be moved by the rise of the air-pressure in the tire to throw said gearing out of operation, substantially as set forth.

11. A device for inflating pneumatic tires comprising pumping devices consisting of a cylinder and a piston therein, gearing for operating the pumping devices when the vehicle moves, an eccentric for moving the gearing into and out of operation, a piston arranged to be moved by the rise of the air-pressure in the tire, a rod connecting the piston and the eccentric, and a spring to hold the gearing normally in operation, substantially as set forth.

12. A device for inflating pneumatic tires comprising pumping devices carried on the vehicle-wheel and consisting of a cylinder and a piston therein, a shaft mounted at its ends in eccentric bearings on the wheel and arranged to actuate said pumping devices, gearing for operating said shaft from a stationary part of the vehicle, said gearing being thrown in and out of operation by the movement of the eccentric bearings of the shaft and means to move said bearings actuated by the variation of air-pressure in the tire, substantially as set forth.

13. A device for inflating pneumatic tires comprising pumping devices carried on the wheel and consisting of a cylinder and a piston therein, a shaft mounted at its ends in eccentric bearings on the wheel and arranged to actuate said pumping devices, a wheel on said shaft, a wheel on the axle with which said first-mentioned wheel gears when the shaft-bearings are moved in one way, and means to move the shaft-bearings actuated by the variation of air-pressure in the tire, substantially as set forth.

14. A device for inflating pneumatic tires comprising pumping devices carried by the wheel and consisting of a cylinder and a piston therein, a shaft mounted at its ends in eccentric bearings on the wheel, gearing for operating said shaft from a stationary part of the vehicle, said gearing being thrown in and out of operation by the movement of the eccentric bearings, means to actuate the pumping devices from the movement of the shaft, and a piston controlled by the variation of air-pressure in the tire, for moving said eccentric bearings, substantially as set forth.

In testimony that I claim the foregoing as my own I have hereto affixed my signature in the presence of two witnesses.

HAYDEN H. WALLS.

Witnesses:
NEWTON CROOKE,
E. N. LESSEY.